United States Patent

Ruesch

[15] 3,695,510

[45] Oct. 3, 1972

[54] APPARATUS FOR READING PUNCHED CARDS

[72] Inventor: Ferdinand Ruesch, St. Gall, Switzerland

[73] Assignee: Gretag Aktiengesellschaft, Regensdorf, Switzerland

[22] Filed: Sept. 1, 1970

[21] Appl. No.: 68,603

[30] Foreign Application Priority Data

Sept. 8, 1969 Sweden ..................13639/69

[52] U.S. Cl. ..............234/30, 235/61.1, 235/61.11 B

[51] Int. Cl. ..............................................G06k 1/04

[58] Field of Search .234/30; 235/61.8, 61.11, 61.10, 235/61.9; 250/219 I

[56] References Cited

UNITED STATES PATENTS 2,980,319 4/1961 Clemens et al. .............234/30

*Primary Examiner*—Maynard R. Wilbur

*Assistant Examiner*—William W. Cochran

*Attorney*—Pierce, Scheffler & Parker

[57] ABSTRACT

Apparatus for reading punched cards is equipped with a punch mechanism for punching a hole at a specified area of a card to indicate implementation of the instructions stored on the card and read by the apparatus. The apparatus also has a sensing mechanism acting at the specified area of the card to check whether a hole already exists there when the card is inserted in the apparatus. The sensing of the presence of such a hole, indicating that the instructions on the card have already been implemented, prevents a repeated implementation of the instructions. Upon a card, not having a hole in the specified area, being accepted in the apparatus for reading of the instructions therefrom, the punch mechanism is locked against operation until a signal indicating implementation of the instructions is received. The apparatus finds particular application in process control.

15 Claims, 6 Drawing Figures

Inventor

Ferdinand Ruesch

By Pierce, Scheffler & Parker

Attorneys

Inventor
Ferdinand Ruesch
By Pierce, Scheffler & Parker
Attorneys

Inventor
Ferdinand Ruesch

By Pierce, Scheffler & Parker
Attorneys

Inventor
Ferdinand Ruesch
By Pierce, Scheffler & Parker
Attorneys

APPARATUS FOR READING PUNCHED CARDS

This invention relates to a device for use in and apparatus for reading information from a flat information-bearing carrier bearing information in the form of punched holes. The invention is particularly concerned with the reading of such information by mechanical means, the carrier being stationary while the hole sensing is effected.

Such readers are often used as data inputs particularly for the control and/or the supervision of semi-automatic processes or plant, the information on the carrier being instructions in relation to the process etc. It would be desirable in such systems to indicate on the information carrier itself whether the information it contains has been read and the instructions implemented. Moreover, the reader should preferably be self-checking against the accidental re-reading of the same information carrier element more than once. Punched hole readers hitherto known in the art are unsuitable for such a purpose. The invention is intended to provide an improvement in this respect.

The invention comprises in one form a device for use in reading information from a flat information-bearing carrier bearing the information in the form of punched holes, the apparatus comprising a holder defining a space for receiving such a carrier, said holder being apertured to allow inspection of the carrier for sensing the punched holes therein; a punch mechanism mounted on said holder; at least one further aperture in said holder through which the punch mechanism is operable to punch at least one further hole in a carrier received in said holder; and releasable means for locking said punch mechanism to prevent operation thereof, said punch locking means being actuable on receipt of an actuating signal to release said punch mechanism for a punching operation.

The hole punched by the punching mechanism of the device above defined is usable to provide a check that the instructions on a carrier received in the holder have been carried out. To this end the actuating signal for releasing the punch locking means may be generated at the end of the implementation of the instructions of the carrier or at the end of a period of time selected to allow the performance of the instructions.

The device is used in combination with other sensing elements for the information stored on a carrier. In another form the invention provides apparatus for reading information from a flat information-bearing carrier bearing the information in the form of punched holes, the apparatus comprising a holder defining a space for receiving such a carrier, said holder being apertured to allow inspection of said carrier for the sensing of the punched holes therein; a plurality of sensing elements mounted to project through said apertured holder to sense the presence of information-representing holes in said carrier; a further aperture in said holder; a punch mechanism operable through said further aperture to punch a further hole in said carrier; and releasable means for locking said punch mechanism to prevent operation thereof, said punch locking means being actuable on receipt of an electrical signal to release said punch mechanism for a punching operation.

Preferably the proposed apparatus further comprises a sensing mechanism including a further sensing element located to sense the presence of a hole at the area of a carrier received in said holder at which said punch mechanism acts; locking means actuable upon the insertion of a carrier into said space to retain said carrier therein; means operable to release said carrier locking means and responsive to the sensing effected by said further sensing element to release said carrier locking means when further sensing element senses a hole in said carrier. The further sensing element is adapted to sense for the presence of a hole in the received carrier after a punching operation. The holder means for the information carrier is provided with a catch or closure for retaining the inserted carrier, the catch being releasable when the further sensing element senses the presence of a hole in the carrier. The catch is locked only if the further sensing element finds "no hole" at the area of the carrier which it senses. Further it is arranged that the sensing of the information-bearing holes is prevented when the catch is unlocked. Preferably the locking means of the closure is so coupled to the locking means of the punching mechanism that the former, having been locked, cannot release until the punching unit has first been operated.

The holder for the carrier serves to correctly locate the carrier received therein for the reading of the information from the carrier. To this end a preferred holder comprises a base member to which is pivotally mounted a flap member. The flap member has two parallel channels with their mouths facing which receive opposite ends of a carrier. In the closed position of the holder the flap and base members define a locating slot for the received carrier, the catch above referred to acting between the flap and base members to secure them in the closed position and preventing the removal of the carrier in the slot. The flap and base members are both provided with apertures for allowing the hole-sensing elements access to the carrier.

Having outlined some of the preferred features of the invention, an apparatus embodying same will now be described by way of example with reference to the accompanying drawings, in which.

The apparatus to be described is intended for reading information from flat carriers in the form of punched cards which, as is well known, can have information stored thereon by punching holes at points selected according to a code; the points normally lie on a rectangular matrix.

Figures 1, 2:
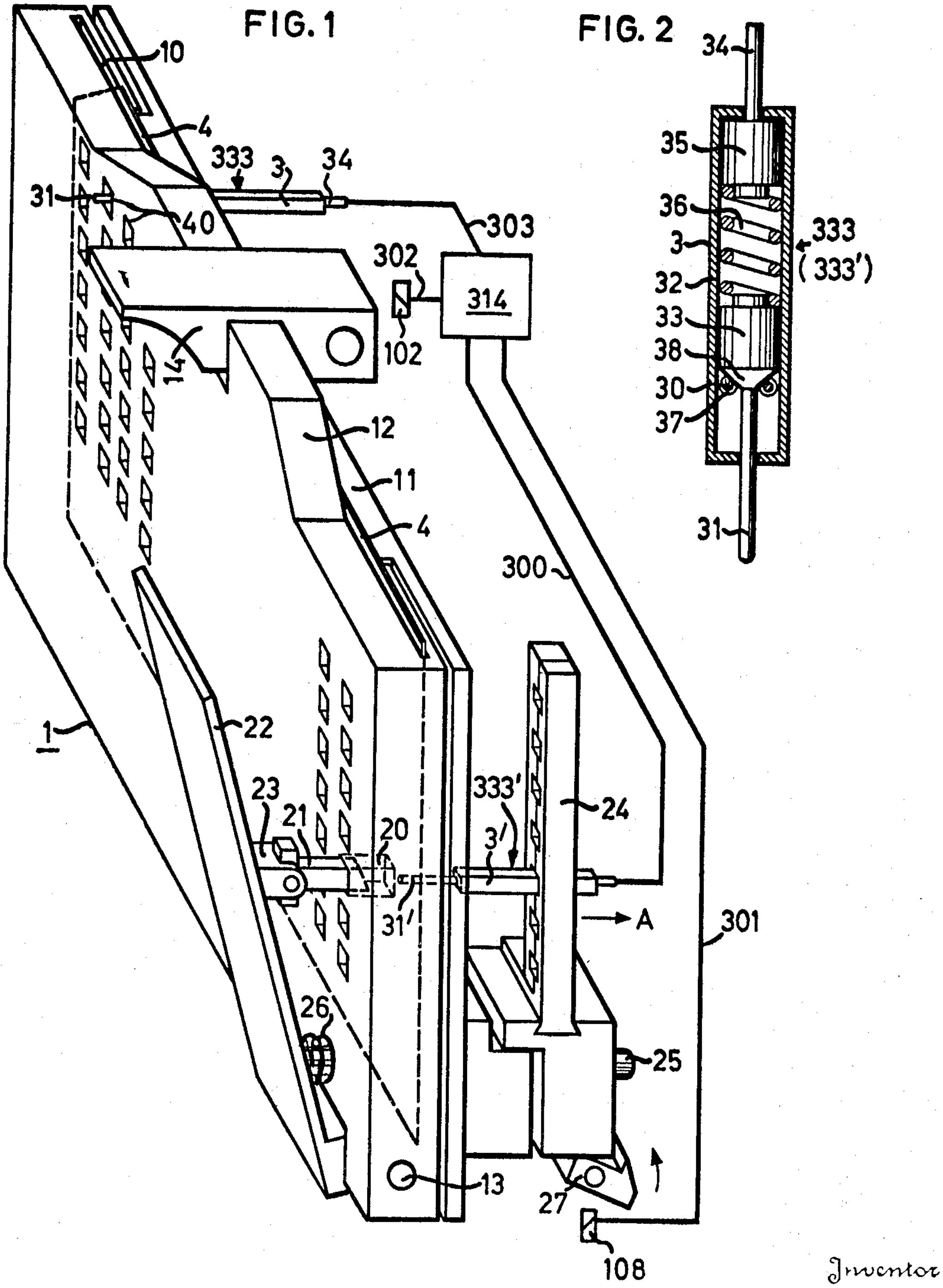
FIG. 1 is a schematic perspective representation of a preferred embodiment of the apparatus of the invention.
FIG. 2 is a detail of a sensing element of the apparatus in FIG. 1, in axial section.

With reference to FIG. 1 of the drawings, the apparatus, which is a punched card reader, comprises a card-handling device generally indicated by 1. The device has a holder comprising a base member formed by a plate 11 and a flap member 12 pivotally mounted to the base by a hinge 13. The base and flap are shown in a closed position and define therebetween a slot 10 for correctly locating a punched card 4. The flap 12 can be tilted away from the base 11 to an open position. To the holder is mounted a punch mechanism comprising a punch head 21 and a driving member 22 to which the punch head is attached by a coupling member 23. The plate 11 is fitted with a releasable catch 14 for locking the plate 11 and the flap 12 together in the closed position and retaining the card 4. The catch 14 is electromagnetically releasable by an electromagnet 102 to which further reference is made below. The punch head 21 passes through a hole 20 in the flap 12 and is operable by the driving lever 22 pivotally mounted on the hinge 13. Punch head 21 and lever 22 are connected by the coupling joint 23.

The plate 11 and flap 12 contain a plurality of apertures 40 (only some of which are shown) opening into the slot 10 at opposite sides thereof, the apertures being in alignment at positions corresponding to the matrix points of the card 4 so that the card can be inspected at these points to ascertain whether or not holes are present. To sense the presence of information-representing holes in the card a plurality of mechanical sensing elements 333 are provided one to each matrix point, only one such element being shown for simplicity and clarity. Each sensing element 333 is mounted at the base side of the card holder and has a spring-loaded pin 31 projecting through a base aperture and, if allowed by a hole in the card 4, extending into the aligned aperture 40 in the flap 12. The operation of the information sensing elements is described in more detail below.

Returning now to the punch mechanism 21, this is operable to punch a hole in the card 4 additional to the information-representing holes. The punch head is normally biased out of engagement with the card 4 by a spring 26. It will be seen that the flap 12 and the plate 11 contain a plurality of further apertures 20 at one end of the holder, there being fourteen such apertures 20 shown in the drawing. The driving lever is constructed such that one punch 21 can be attached to the lever 22 in a selected one of a plurality of positions that register with the apertures 20. This permits a control hole to be punched into the punched cards in different positions or for more than one punch head 21 to be attached to lever 22 to allow more than one control hole to be punched.

The punching mechanism is only allowed to operate if there is no hole already present in the area of the card 4 at which the punch mechanism acts. In order to sense the presence of a hole at this area, an additional sensing element 333' is provided and mounted to a support means 24. This support means contains a number of apertures for locating the sensing element 333', the locating apertures having positions corresponding to positions of apertures 20 and thus of the possible positions of the punch head. In order that the additional sensing element acts at the same area on the card 4 as the punch mechanism it is located in the corresponding, aligned position on the support member 24. If required more than one additional sensing element 333' may be used in correspondence with the use of more than one punch head 21. The holder 24 is so movable and adjustable that the sensor 333' can always be brought into axial alignment with the punch 21.

As already indicated, for restoring the lever 22 into its rest position when a hole has been punched a spring 26 is provided. It is obviously desirable that the operation of the punch mechanism 21, 22, 23, should not damage the cooperating sensing element 333'. To avoid such damage the support member 24 is displaceable in the direction of arrow A to withdraw the pin 31 of element 333' from the slot 10. The support member 24 is coupled to the punch mechanism through the action of a tappet 25 operable by the punch driving movement of the lever 22 to move the support member 24 in the direction A and thereby avoid the punch head striking the sensing element.

For normally locking the punching mechanism 21, 22, 23 against operation, a hinged releasable catch is provided which in the illustrated embodiment resembles a pawl 27. The catch 27 is electromagnetically releasable by an electromagnet 108 described further below. For functionally linking and controlling the sensing elements 333 and 333', as well as the two catches 14 and 27, an electric control unit 314 is provided. The sensing elements 333 (only one shown) are each connected to unit 314 by a respective line 303; the sensing element 333' is connected by a line 300; the actuating magnet 102 of the catch 14 is connected by a line 302; and the actuating magnet 108 of the catch 27 is connected by a line 301. The control circuitry and its functions are explained in greater detail hereinafter with reference to FIG. 3.

The sensing elements 333 and 333' are preferably in the form of electrical button contactors 3 and 3' respectively, the preferred form of construction applicable to all the elements being shown in FIG. 2. Slidably guided inside a casing 32 that may be of plastics material are the sensing pin 31 and a second pin 34, both being of electrically conductive material. The butts 33 and 35 respectively of the two pins 31 and 34 are separated by an interposed electrically conducting spring 36. A contact wire 37 is inserted through each of two holes 30 in the casing to form one contact of a contact pair. The other contact is provided by the sloping forward face 38 of the butt 33 to provide electrical contact to the contact wire 37 when the pin 31 is in an extended position which it adopts when passing through a hole in a punched card. When the sensing pin 31 is pushed inwards, as when there is no hole in the card being sensed, contact is broken. Thus the pin 31 itself is part of the contact but of course, actuation of a separate contact arrangement by the pin could be employed. The pin 34 serves as an electrical terminal for each sensing element.

Figure 3:
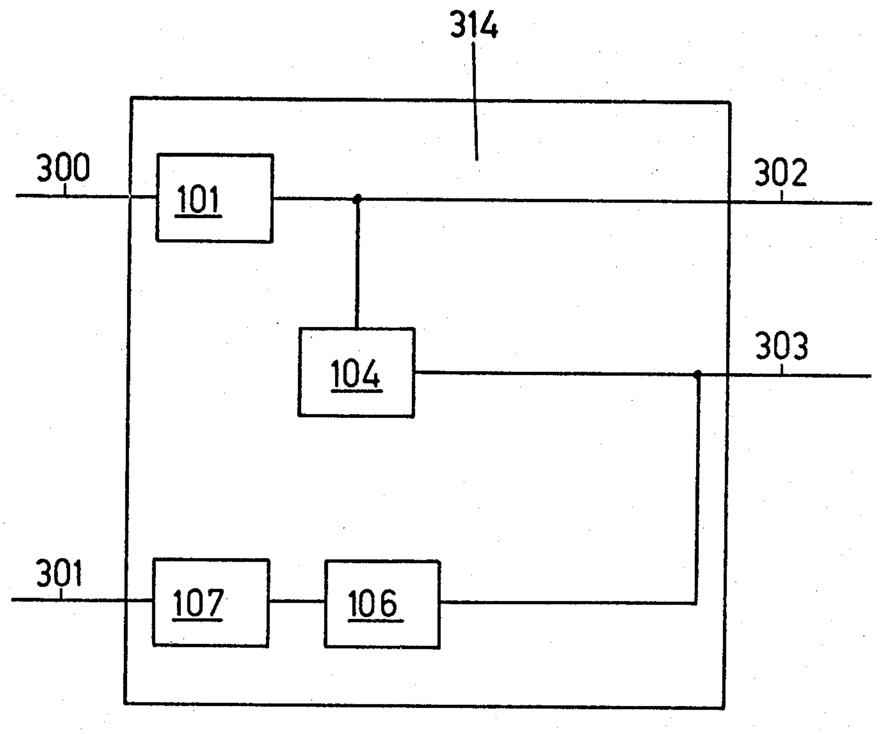
FIG. 3 is a block diagram of the electrical control unit 314 of the apparatus according to FIG. 1.

Referring now to FIG. 3, the control unit 314 comprises a first relay 101 operated by the closure of the contact pair of the sensing element 333' via the line 300. A second relay 104 is in turn operated in response to operation of the first relay 101. The first relay 101 is also connected to supply operating potential to the electromagnet 102 of the catch 14 over line 302 upon operation of relay 101. A third relay 107 is connected to control the application of operating potential to the electromagnet 108 of the catch 27 via the line 301. The second relay 104, if unenergized, supplies operating potential to the third relay 107 through an interposed timing unit 106. This potential is also applied to the sensing elements 333 via the line 303 so that they can generate electrical signals in accordance with the presence or absence of holes at the matrix points of card 4. The relays may be replaced in some circumstances by simple contacts to generate the signals energizing the electromagnets 102 and 108. The energizing current source is not shown in the drawings.

The operation of the apparatus illustrated in FIGS. 1 to 3 will now be given. It is assumed that the information coded on punched card 4 is a set of instructions for some process (such as is described with reference to FIGS. 4 to 6 hereafter) and that the implementation of the instructions is to result in the punching of a hole by the punch mechanism 21, 22, 23.

The punched card 4 that is to be read is inserted into the channels defining the ends of the slot 10 in the open flap 12. The flap 12 containing the punched card 4 is then closed so that it is in the position shown in FIG. 1 in which it is retained by the catch 14 and locked to the plate 11. The sensing element 333' then detects whether a hole is already present in the position where the implementation hole is to be punched. If a hole is present or if no punched card had been inserted at all, the relay 101 is operated and energizes the electromagnet 102 associated with the catch 14. This causes an arresting spring for example (not shown) to be withdrawn and the catch 14 to be released whereby the card 4 may be removed. However, if the sensor 333' finds that there is "no hole" then the magnet 102 will not be energized and the relay 104 remains unenergized by relay 101. In such a case relay 104 applies voltage to all the sensors 333 of the reading unit and the sensors are thus activated to read the information-representing holes in the card 4. The sensors 333, which are located at every possible location of a hole on the matrix of the punched card, now supply signals to initiate a desired sequence of events in accordance with instructions coded on the card 4. For instance they may activate a sequence control means which eventually gives a signal indicating performance of the instructions; or a timing device may be started. FIG. 3 illustrates the latter alternative. The timing device 106 first puts the relay 107 into a state in which the catch 27 is locked by energization of the magnet 108. At the end of a predetermined time during which the punched card 4 is inspected by the sensors 333 and the program coded on the punched card is implemented, a return pulse (implementation signal) or in the illustrated system, the timing device 106 transfers the relay 107 back into the state in which the magnet 108 releases the catch 27. The electrical signal for releasing the catch 27 is here the removal of operating potential from the magnet. It will be appreciated that the catch 27 and electromagnet 108 could be adapted such that the application of operating potential to electromagnet 108 constituted the release signal. In the release position of the catch 27 the implementation hole can be punched into the punched card 4. This results in the sensing element 333' (withdrawn during the punching operation) now sensing the presence of a "hole" and causing the relay 101 to inactivate the sensors 333 via the relay 104; at the same time the magnet 102 will be energized which releases the catch 14. The card holder can then be opened and the punched card 4 taken out.

The functional characteristics of the described reading unit for punched cards are therefore as follows:

a. The apparatus does not work unless the sensing element 333' reports "no hole." In such a case the catch 14 remains locked.

b. The catch 27 locks the punch mechanism 21, 22, 23, until for example, an instruction recorded on the punched card and read by the reader has been implemented.

c. When this is the case the punch mechanism 21, 22, 23 is released. The catch 14 still remains locked during the punching operation.

d. When a hole has been punched by the punching unit 21, 22, 23 the sensor 333' detects the presence of the "hole" and allows the catch 14 to be released.

This monitoring method prevents a punched card from being removed before instructions have been carried out, and it also avoids the same instructions being read and carried out twice.

The punch mechanism of the punched card code reader illustrated in FIGS. 1 to 3 is manually operated when it has been released according to program. However, the punch may be equipped with a special electromagnetic actuator shown diagrammatically at 50 which is activated or driven either directly or indirectly by the signal that also releases the punch mechanism for operation.

Having described the apparatus examples will now be given of its application to the control of various process equipments shown in FIGS. 4, 5 and 6.

Figure 4:
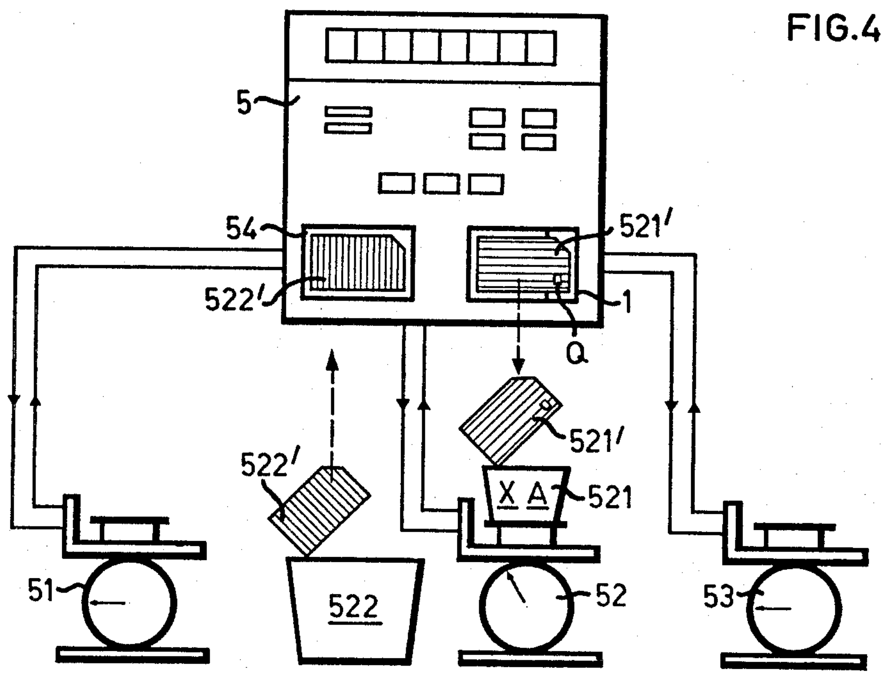
FIG. 4 is a schematic representation of one equipment utilizing the apparatus of FIGS. 1 to 3 for monitoring and controlling weighing operations.

FIG. 4 shows equipment 5 containing a punched card reader apparatus of the kind above described for controlling and monitoring weighing machines 51, 52 and 53. By way of example, the weighing machines 51, 52 and 53 are assumed to be designed for different ranges of weights, only one of the machines being in operation at any one time. From a vessel 522 that is provided with an identification card 522' a quantity X of a substance A is required to be transferred into a vessel 521 supported on weighing machine 52. The identification card 522' is inserted into a punched card reader 54. The process instructions are recorded as punched holes on an order or recipe card 521'. This may contain, more particularly, data specifying substance, quantity, tolerances, weighing machine type to be used and so forth. The recipe card 521' is inserted into a card reader apparatus constructed as illustrated in FIG. 1 operating such that the card cannot be removed until the weighing operation has been accomplished according to the recipe and its implementation reported.

Upon carrying out of the instructions, the recipe card 521' now provided with an implementation hole Q then becomes the identification card for the vessel 521 containing the quantity X of the substance A.

Figure 5:
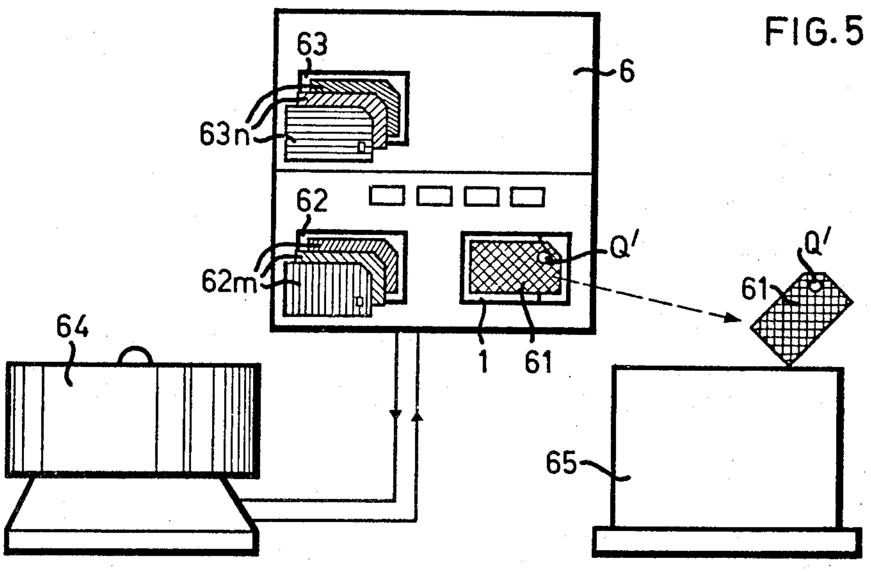
FIG. 5 is a schematic representation of another equipment utilizing the apparatus for monitoring and controlling mixing operations.

The equipment 6 shown in FIG. 5 for supervising and controlling mixing operations likewise contains a card reader apparatus 1 of the invention. The punched identification card 62 *m*, 63 *n* of the substances that are to be mixed in a mixer 64 are inserted into the card readers 62 and 63. The instruction card 61 is inserted into the card reader 1. The correct performance of the instructions involving the mixing of the prescribed substances is recorded by the provision of the implementation hole Q' on the instruction card 61. The implemented instruction card 61 may now become the identification card for the mixed substance contained in vessel 65.

Figure 6:
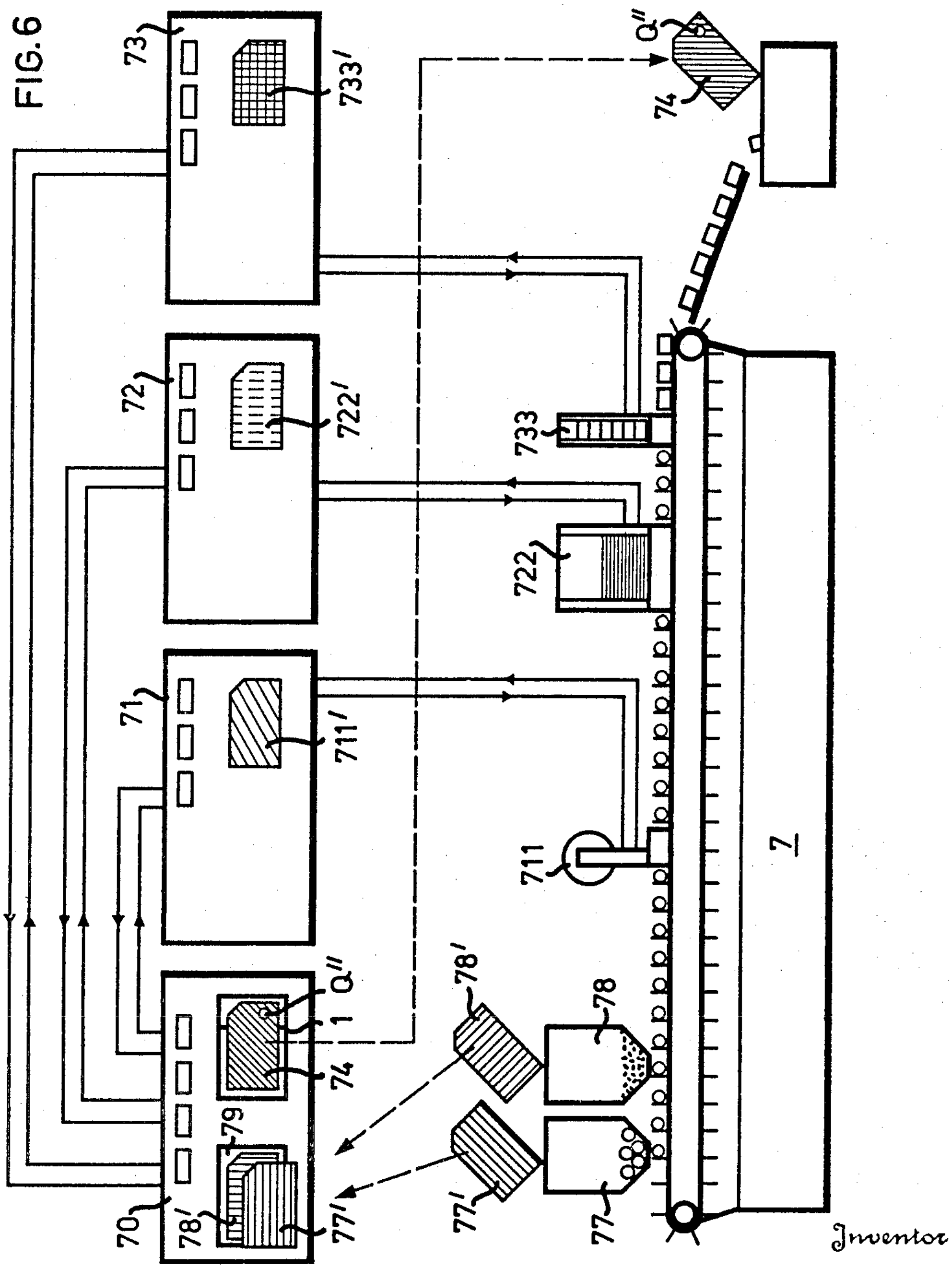
FIG. 6 is a likewise schematic representation of yet another equipment utilizing the apparatus for monitoring and controlling a packing process.

FIG. 6 schematically illustrates a packing line 7. Small tubes 77 are to be filled with a substance 78. Each tube is provided with a label 711 and packed in a box 733 and accompanied by a prospectus 722. Labels 711, prospectuses 722 and boxes 733 may be each checked for accuracy by a code inspector 71, 72, 73. The code that is to be checked is inserted into the code inspectors in the form of respective punched cards 711', 722' and 733'. The three code inspectors 71, 72, 73 are monitored by a supervising control unit 70 which contains a card reader apparatus 1 according to the invention. The instruction card 74 which records the packing program is inserted into this reader. The identification card 78' accompanying the substance 78 as well as for instance the identification card 77' for the tubes are inserted into a card reader 79. The correctly performed packing process is receipted by the card reader 1 punching a hole Q'' into the instruction card 74. The receipted instruction card 74 may then be further used for instance as an identification card for the the boxes of the packed substance 78.

What is claimed is:

1. A device for use in reading information from a flat information-bearing carrier bearing the information in the form of punched holes, the apparatus comprising a holder defining a space for receiving such a carrier, said holder being apertured to allow inspection of the carrier for sensing the punched holes therein; a punch mechanism mounted on said holder; at least one further aperture in said holder through which the punch mechanism is operable to punch at least one further hole in a carrier received in said holder; releasable means for locking said punch mechanism to prevent operation thereof, said punch locking means being actuable on receipt of an actuating signal to release said punch mechanism for a punching operation; a sensing mechanism located to sense the presence of a hole at the area or areas of a carrier received in said holder at which said punch mechanism acts; locking means actuable upon insertion of a carrier into said holder space to retain said carrier therein; and means operable to release said carrier locking means and responsive to the sensing effected by said sensing mechanism to release said carrier locking means when said sensing mechanism senses a hole or holes in said carrier.

2. A device as claimed in claim 1 wherein said sensing mechanism is adapted to sense for the presence of a hole in a locked carrier after a punching operation to operate said carrier locking release means for allowing removal of said carrier from said holder.

3. A device as claimed in claim 1 wherein said punch mechanism comprises a punch head engageable with a carrier received in said holder and a driving member to which said punch head is mounted, and said sensing mechanism comprises a hole sensing element and a support member therefor, said driving member and said support member each having a plurality of corresponding positions at which said punch head and sensing element respectively are mountable to act at selected areas of a carrier received in said holder, said punch head and said further sensing element being mounted at corresponding positions on said driving member and support member respectively to act at the same area of said received carrier.

4. A device as claimed in claim 1, wherein said punch mechanism and said sensing mechanism are located with said holder therebetween, said holder having one or more apertures therein opening into said space at the opposite side thereof to said one or more further punch apertures and in alignment therewith, said sensing mechanism including one or more sensing elements projecting through said one or more apertures opposite said one or more punch apertures and means by which said one or more sensing elements are supported, said support means being displaceably mounted for movement to withdraw said one or more sensing elements from said space; and further comprising means for displacing said support means coupled to said punch mechanism to cause such withdrawal of said one or more sensing elements upon operation of said punch mechanism.

5. Apparatus for reading information from a flat information-bearing carrier bearing the information in the form of punched holes, the apparatus comprising a holder defining a space for receiving such a carrier, said holder being apertured to allow inspection of said carrier for the sensing of the punched holes therein; a plurality of sensing elements mounted to project through said apertured holder to sense the presence of information-representing holes in said carrier; a further aperture in said holder; a punch mechanism operable through said further aperture to punch a further hole in said carrier; releasable means for locking said punch mechanism to prevent operation thereof, said punch locking means being actuable on receipt of an electrical signal to release said punch mechanism for a punching operation; a further sensing element located to sense the presence of a hole at the area of a carrier received in said holder at which said punch mechanism acts; locking means actuable upon the insertion of a carrier into said space to retain said carrier therein; means operable to release said carrier locking means and responsive to the sensing effected by said further sensing element to release said carrier locking means when said further sensing element senses a hole in said carrier; said punch mechanism including an actuator therefore to cause operation of the punch mechanism, said actuator being actuable in response to the release of said punch locking means.

6. Apparatus as claimed in claim 5, wherein said further sensing element is adapted to sense for the presence of a hole in said received carrier after a punching operation.

7. Apparatus as claimed in claim 5, wherein said punch mechanism comprises a punch head engageable with a carrier received in said holder and a driving member to which said punch head is mounted, and said sensing mechanism further comprises a support member to which said further sensing element is mounted, said driving member and said support member each having a plurality of corresponding positions at which said punch head and said further sensing element are mountable to act at selected areas of a carrier received in said holder, said punch head and said further sensing element being mounted at corresponding positions on said driving member and said support member respectively to act at the same area of said received carrier.

8. Apparatus as claimed in claim 5, wherein said holder comprises a base member and a flap member pivotally mounted thereto for movement between an open position at which a carrier is insertable into said holder, and a closed position at which said base and flap members define therebetween a slot locating a received carrier for the sensing of the information-representing holes therein; and said carrier locking means comprises a catch actuable between said base member and said flap member to lock same in said closed position.

9. Apparatus as claimed in claim 8, wherein said information sensing elements and said further sensing element each comprises a spring-loaded pin, and wherein said apertured holder has a first set of apertures in said base member through which respective pins project towards said space and a second set of apertures in said flap member aligned with said first set for allowing entry of a pin passing through a hole in a received carrier.

10. Apparatus as claimed in claim 9, wherein each spring-loaded pin is operable to adopt a first or second position in dependence on whether a hole is sensed or not respectively in a received carrier, and each sensing element further comprises electrical contact means actuable in dependence upon the position of the respective pin to read out the presence or absence of a hole in the received carrier as an electrical signal.

11. Apparatus as claimed in claim 5, wherein said holder has a further aperture in alignment with said aperture through which said punch mechanism acts to provide access to said space opposite said punch mechanism aperture, said further sensing element projecting through said further aperture.

12. Apparatus as claimed in claim 11, wherein said sensing mechanism further comprises a displaceably-mounted support member for said further sensing element, said support member being displaceable to withdraw said further sensing element from said space; and further comprising means for displacing said support member coupled to said punch mechanism to cause withdrawal of said further sensing element upon operation of said punch mechanism.

13. Apparatus according to claim 10 comprising switching means connected to said contact means of the information sensing elements to supply potential thereto, said switching means being controllable by said further sensing element to prevent and allow the supply of potential thereto when said further sensing element senses the presence and absence respectively of a hole in a received carrier.

14. Apparatus as claimed in claim 5 having a carrier bearing information in the form of a set of instructions inserted in said holder; means coupled to said information sensing elements and responsive to the sensed information to implement said set of instructions; and means for providing an electrical signal indicative of the implementation of said set of instructions, said punch locking means being connected to receive said electrical signal as said signal to release said punch mechanism for a punch operation.

15. Apparatus as claimed in claim 6 having a carrier bearing information in the form of a set of instructions inserted in said holder; means coupled to said sensing mechanism to lock said punch sensing mechanism upon the sensing of the absence of a hole at said area by said sensing mechanism; means coupled to said information sensing elements and responsive to the sensed information to implement said set of instructions; and means for providing an electrical signal indicative of the implementation of said set of instructions, said punch locking means being connected to receive said electrical signal as said signal to release said punch mechanism for a punch operation.

* * * * *